Figure 4:
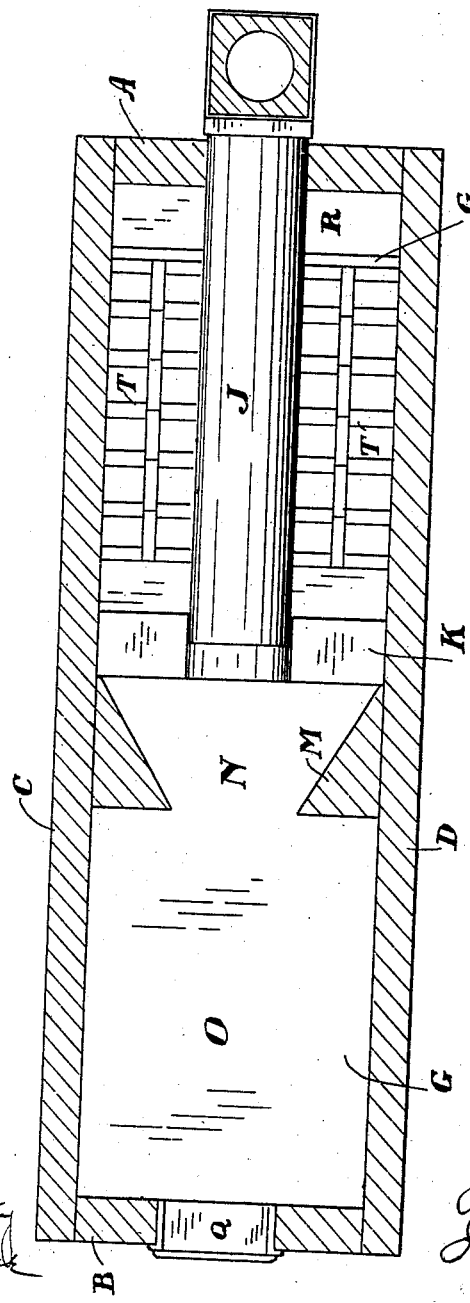

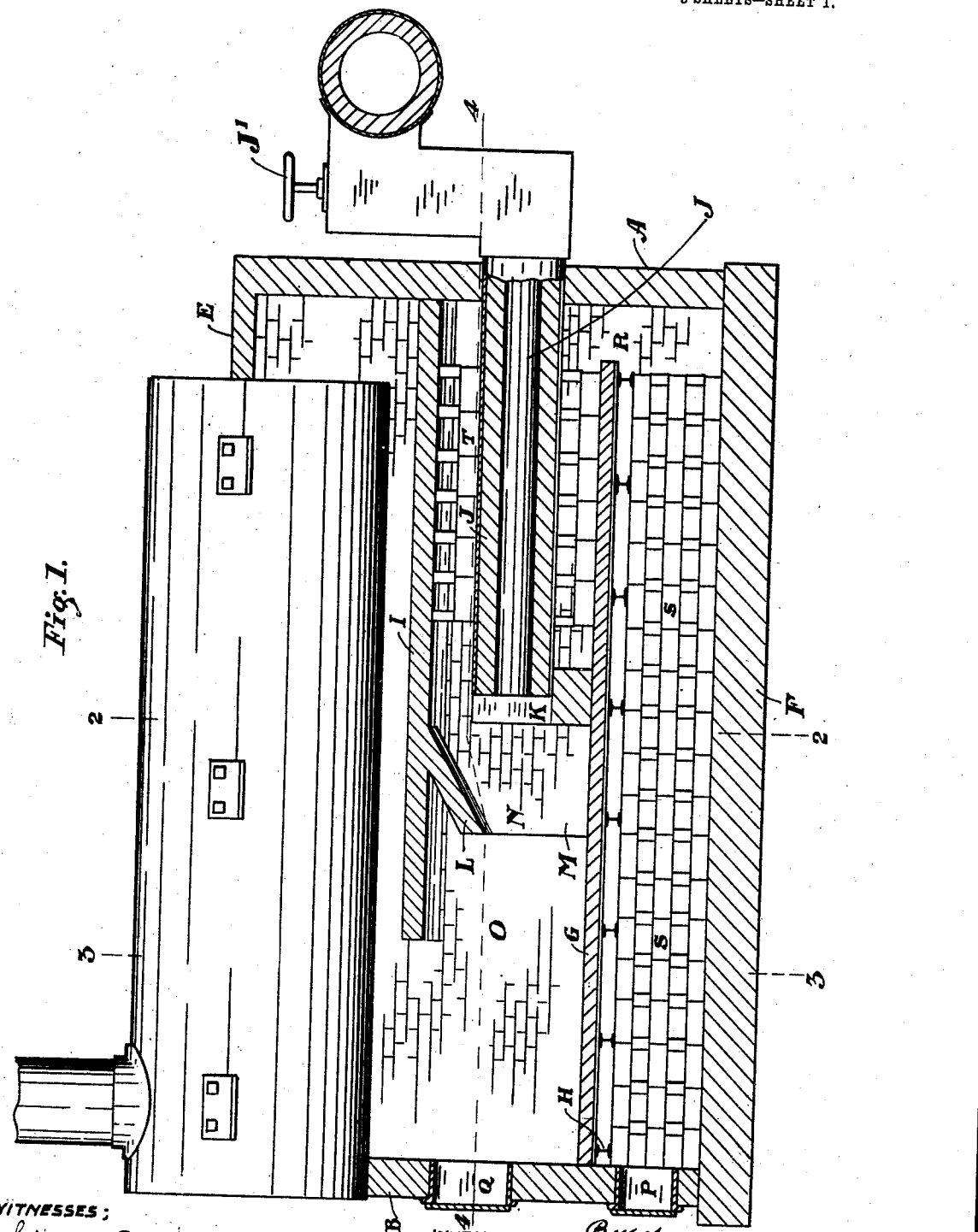

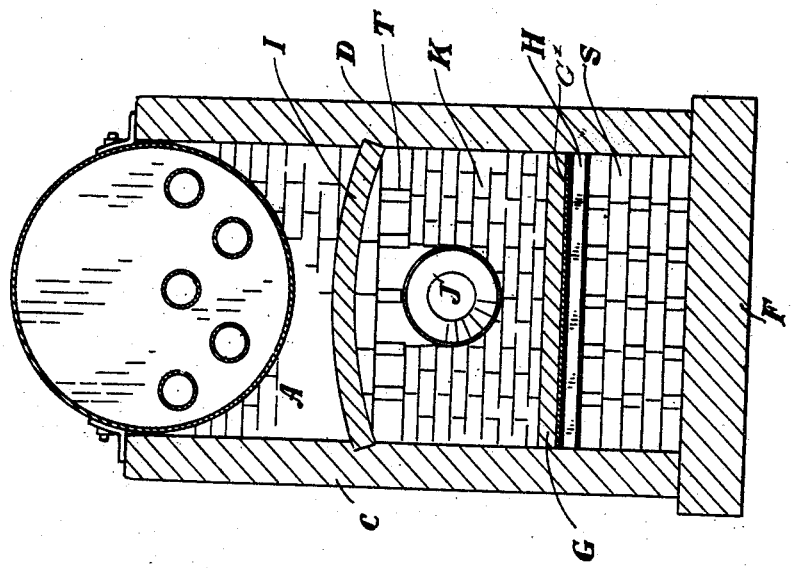
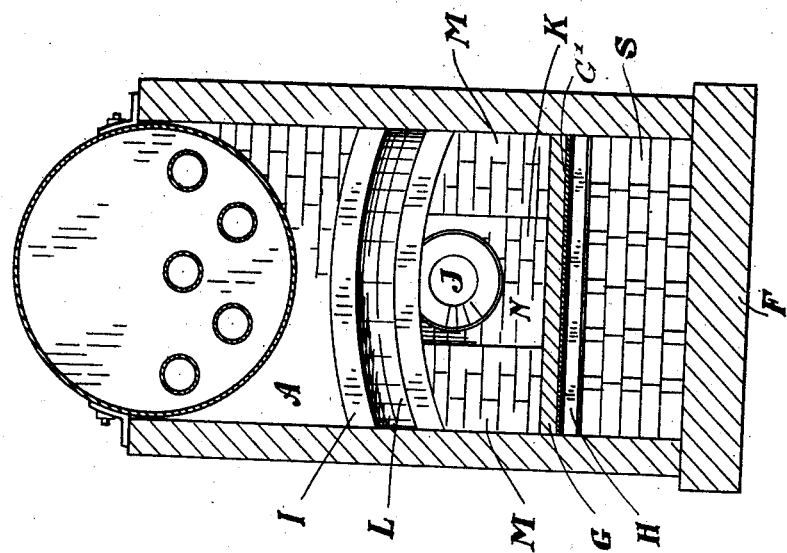

No. 866,787. PATENTED SEPT. 24, 1907.
R. G. HEMINGRAY & J. O. JENSEN.
FURNACE.
APPLICATION FILED AUG. 20, 1906.

3 SHEETS—SHEET 3.

WITNESSES:

INVENTORS
Ralph G. Hemingray
John O. Jensen
BY
Thomas L. Ryan
ATTORNEY

UNITED STATES PATENT OFFICE.

RALPH G. HEMINGRAY, OF MUNCIE, INDIANA, AND JOHN O. JENSEN, OF ROCHESTER, NEW YORK.

FURNACE.

No. 866,787.  Specification of Letters Patent.  Patented Sept. 24, 1907.

Application filed August 20, 1906. Serial No. 331,403.

*To all whom it may concern:*

Be it known that we, RALPH G. HEMINGRAY and JOHN O. JENSEN, citizens of the United States, residing at the cities of Muncie, in the county of Delaware and State of Indiana, and Rochester, in the county of Monroe and State of New York, respectively, have invented a new and useful Furnace, of which the following is a specification.

Our invention relates to improvements in furnaces wherein vaporized fuel is employed, such as artificial or producer gas.

In furnaces of this character as at present devised, the combustion obtained is so imperfect that quantities of the fuel consumed, are wasted and lost, and great difficulty is experienced in the generation and maintenance of a degree of heat of high efficiency.

The objects of our invention are to provide facilities in a furnace of this kind whereby the maximum degree of efficiency of the fuel consumed may be utilized and the waste of the same prevented, and whereby the maximum degree of heat possible to be obtained by the expenditure of a given amount of the fuel may be quickly generated and fully and equably maintained. These and other objects which will become apparent as the specification of our invention is disclosed are accomplished by the new and novel construction and arrangement of parts as shown in the following description, pointed out in the claims, and illustrated in the accompanying drawings.

In the disclosure herein of our invention we have shown our furnace adapted to the heating of an ordinary flue boiler, and we have employed as fuel, producer gas, to the use of which fuel our furnace is especially adapted.

It will be understood that our improved furnace is applicable to use for the heating of boilers of the water-tube type, as well as for the type of boiler as herein shown, and for any purpose, in fact, where it is desired to generate, through the medium of vaporized fuel, such as producer gas, a uniform and intense heat in a short time, and to maintain the same equable and without waste of fuel, or loss of its efficiency.

In the drawings, similar letters of reference refer to similar parts throughout the several views, in which Figure 1 is a vertical central longitudinal section of our improved furnace showing the boiler, the baffles, and the gas-valve in elevation; Fig. 2 is a transverse sectional view on the line 2—2 Fig. 1; Fig. 3 is a transverse sectional view on the line 3—3 Fig. 1; and Fig. 4 is a top plan sectional view on the line 4—4 Fig.1.

The features of our invention reside in the introduction at the rear of the furnace, of gas direct from the producer, through a conduit of such structure and length that it will become heated and retain in itself a high degree of heat, and then the baffling of such gas at its entry into the furnace proper and as it is ignited; also such construction and arrangement of the parts of the furnace that by the radiation of the heat therefrom the oxygen to be mixed with the consuming gas will be sufficiently primarily heated so that such perfect combination of the gas therewith will be effected that the maximum degree of heat and combustion will be obtained in the chamber or part of the furnace intended therefor and its dissipation or emanation, before its escape to and about the object to be heated, will be prevented.

A designates the rear, B the front, and C and D the side walls, and E the top of the furnace, built up of ordinary fire brick, and within which the boiler is supported. F designates suitable base.

Extending rearwardly to and within a proper distance from the rear wall A and transversely completely across the width of the furnace, is the floor G constructed of fire brick and supported on the sheet metal plate $G^1$ overlaying and resting upon the cross-beams H. Extending forwardly from the rear wall and to within a proper distance from the front wall is the continuous arch I, as plainly shown in Fig. 1 and Fig. 2. J designates a conduit which may be of any suitable shape in cross section, and which we designate as being constructed of a metallic pipe or cylinder lined with fire brick or other refractory material; this conduit is arranged so as to pass through the rear wall of the furnace and to extend forwardly to within a given distance short of the full length of the arch I. The frontal end of this conduit is supported in the transverse wall K which rests on the floor G, being continuous and closed underneath and which terminates on a line with the top of the conduit, as shown in Fig. 1 and Fig. 2. The rear end of this conduit is communicatingly connected directly with the discharge pipe of the gas producer, at which connection is provided the suitable valve $J^1$ whereby the quantity of gas to be fed into the conduit may be varied or controlled.

Formed integrally with the frontal portion of the arch I and obliquely disposed thereto is the baffle-arch L, and extending obliquely transversely from the side walls are the baffle walls M; these slanting walls and slanting roof form the funnel-shaped chamber N which communicates with the combustion chamber O, the function of the roof L being to impel downwardly the products of combustion and the heat generated thereby, whereby the heat of the floor of the combustion chamber is accentuated, the air current thereunder being in turn heated thereby primarily as hereinafter described. P and Q designate suitable openings in the wall B provided with doors, the functions of which openings will be hereinafter disclosed.

Occupying the space beneath the floor G and from the front wall to the chamber R, and also occupying the space about the conduit J from the rear end of the floor G forwardly to within a proper distance from the wall K are the transversely and longitudinally extending lines of fire brick baffles S and T respectively, commonly known as "checker work", forming a succession of passage ways through which percolates the current of oxygen admitted through the opening P and which combines or merges with the gas in the chamber N and chamber O where the combustion of the gas and the oxygen is effectively accomplished.

In the operation of our invention, fagots are introduced into the chamber O through the opening Q and kindled; the valve J¹ is then opened whereby the gas from the producer is introduced through the conduit J and which promptly ignites at the chamber N. The gas as produced and admitted into the conduit having an initial high degree of heat, the conduit readily becomes heated; as the consumption of the gas continues, and as the heat intensifies, a draft of the oxygen through the opening P is induced. The floor G having become heated, the oxygen proceeding toward the rear of the furnace underneath the floor, in turn becomes warmed, the baffles S retarding the progress of the current sufficiently so that the maximum degree of heat afforded by the floor and baffles may be accumulated by the current reaching the chamber R where it ascends into the chamber surrounding the heated conduit J, and is again retarded, by the baffles T. The current at this stage of its progress being already heated to a high degree of temperature, rapidly becomes heated to a higher degree as in its draft forwardly immediately under the arch I it accumulates additional heat from the radiating heat of said arch, whence it proceeds to the chamber N immediately in front of the mouth of the conduit J. At this point the highly heated current, is, by the converging walls and arch drawn irresistibly and perfectly into combination with the gas emitting from the conduit, whence the products of combustion proceed into the chamber O where the thorough combustion of the completely combined elements, occurs.

The arch I, in its portion above the conduit J, having become heated to a high degree, besides transmitting great heat to the current of air passing forwardly thereunder, radiates great heat upwardly sustaining the high degree of heat of the furnace passing from the chamber O to the object to be heated, and to the rear of the furnace. The function of the forwardly extending portion of the arch I is the prevention of the ascent or escape from the combustion chamber of the products of combustion, until the combustion is practically completed. By this ingenious construction and arrangement of parts the heat radiated by the floor and the arch of the furnace and by the conduit J is so utilized, that the oxygen passing into the furnace and later to be combined with the gas, is thoroughly heated before such combination takes place, thus the efficiency of the gas is not lessened or encroached upon in the process of combustion. This manner of conveying and introducing into the furnace of the producer gas and the oxygen or air, whereby the occurrence of cold or underheated drafts of air or gas, at the combining or mixing aperture and at the combustion chamber, is prevented, is one of the important features of our invention, the maximum degree of the efficiency of the fuel consumed being wholly conserved and utilized.

What we claim as our invention, and desire to secure by Letters Patent, is—

1. In a furnace, the combination with the boiler, of a combustion chamber under the front portion of the boiler, a horizontally disposed plate under the rear portion of the said boiler and separate therefrom to leave a passage-way between said plate and boiler, the forward end of the said plate extending over the rear portion of the said combustion chamber, a mixing chamber at the rear of the combustion chamber with its top inclining downward from said plate towards said combustion chamber, a producer gas conduit extending through the rear portion of said furnace below said plate and to said mixing chamber, and a baffled air passage-way surrounding said conduit and under said plate with an inlet in the rear portion of the furnace, substanitally as set forth.

2. In a furnace, the combination with a boiler, of a combustion chamber under the front portion of the boiler a horizontally disposed plate under the rear portion of said boiler and separate therefrom to leave a passage-way between said plate and the boiler, the forward end of said plate extending over the rear portion of said combustion chamber, a mixing chamber at the rear of the combustion chamber with its top inclining downward from said plate towards said combustion chamber, a producer-gas conduit extending through the rear portion of said furnace below said plate and to said mixing chamber, a baffled air passage-way surrounding said conduit and under said plate with the inlet to said passage-way in the rear portion of the furnace, a wall at the discharge end of said conduit closing the lower portion of said air passage way so that the air will be required to pass over said wall and in contact with said plate above.

3. In a furnace, the combination with a boiler, of a combustion chamber under the front portion of the boiler, a horizontally disposed plate under the rear portion of the said boiler and separate therefrom to leave a passageway between said plate and the boiler, the forward end of said plate extending over the rear portion of said combustion chamber, a mixing chamber at the rear of the combustion chamber with its top inclining downward from the plate and its walls slanted toward each other and towards said combustion chamber, a producer-gas conduit extending through the rear portion of said furnace below said plate and to the said mixing chamber, a baffled air passageway surrounding said conduit and under said plate with the inlet to said passageway in the rear portion of the furnace, a wall at the discharge end of said conduit closing the lower portion of said air passageway so that the air will be required to pass over said wall and in contact with said plate above.

4. In a furnace, the combination with a boiler, of a combustion chamber under the front portion of the boiler, a horizontally disposed plate under the rear portion of the said boiler and separate therefrom to leave a passageway between the said plate and the boiler, the forward end of said plate extending over the rear portion of said combustion chamber, a mixing chamber at the rear of the combustion chamber with its top inclining downward from the plate and its walls slanted toward each other and towards said combustion chamber, a producer-gas conduit extending through the rear portion of said furnace below said plate and to the said mixing chamber, a baffled air passageway surrounding said conduit and under said plate with the inlet to said passageway in the rear portion of the furnace, a wall at the discharge end of said conduit closing the lower portion of said air-passageway so that the air will be required to pass over said wall and in contact with said plate above, and a horizontally disposed plate extending from the front of the furnace under the combustion chamber and under said passageway surrounding the producer-gas conduit, and a baffled air passageway under said last mentioned plate with an inlet at the front end of the furnace and an outlet therefrom at the rear of the furnace into the passageway surrounding said conduit, substantially as set forth.

In testimony whereof we have hereunto signed our names, in the presence of two subscribing witnesses.

RALPH G. HEMINGRAY.
JOHN O. JENSEN.

Witnesses:
A. F. RUNYAN,
F. W. GOLDIE.